(12) United States Patent  (10) Patent No.: US 7,475,179 B2
Osaka  (45) Date of Patent: Jan. 6, 2009

(54) EQUAL-AMPLITUDE SIGNALING DIRECTIONAL COUPLING BUS

(75) Inventor: Hideki Osaka, Kawasaki (JP)

(73) Assignee: Renesas Technology Corp., Tokyo (JP)

( * ) Notice: Subject to any disclaimer, the term of this patent is extended or adjusted under 35 U.S.C. 154(b) by 296 days.

(21) Appl. No.: 10/517,591

(22) PCT Filed: Jul. 1, 2003

(86) PCT No.: PCT/JP03/08357

§ 371 (c)(1),
(2), (4) Date: Dec. 13, 2004

(87) PCT Pub. No.: WO2004/003719

PCT Pub. Date: Jan. 8, 2004

(65) Prior Publication Data

US 2005/0251598 A1    Nov. 10, 2005

(51) Int. Cl.
G06F 13/00 (2006.01)
G06F 13/14 (2006.01)
H01P 5/04 (2006.01)
H01P 5/12 (2006.01)
H01P 5/18 (2006.01)
H03H 2/00 (2006.01)

(52) U.S. Cl. .............. 710/300; 710/305; 333/24 R; 333/109

(58) Field of Classification Search ......... 710/300–302, 710/105–106, 305; 333/24 R, 109, 115–116, 333/111
See application file for complete search history.

(56) References Cited

U.S. PATENT DOCUMENTS 3,516,065 A * 6/1970 Bolt et al. .................. 375/257

(Continued)

FOREIGN PATENT DOCUMENTS

JP  7-141079  6/1995

(Continued)

OTHER PUBLICATIONS

Kal, S. et al. "Empirical Relations for Capacitive and Inductive Coupling Coefficients of Coupled Microstrip Lines". IEEE Transactions on Microwave Theory and Techniques. vol. MTT-29. No. 4. Apr. 1981. pp. 386-388.*

(Continued)

*Primary Examiner*—Mark Rinehart
*Assistant Examiner*—Thomas J Cleary
(74) *Attorney, Agent, or Firm*—Antonelli, Terry, Stout & Kraus, LLP.

(57) ABSTRACT

In ultrahigh speed data transfer, a drive pulse is attenuated due to a skin effect and a dielectric loss, and a tail generated by a sub coupler extends as the drive pulse propagates on the main line. For that reason, an intersymbol interference becomes large, which causes jitters. In a memory system to which a plurality of DRAM memory modules are connected, in order to transfer data at high-speed, directional couplers are wired between a main controller and each of the modules, and the coupling lengths become longer with farther ends, thereby suppressing jitters. The directional couplers are wired between the main controller and each of the modules, and the coupling lengths are made longer with the farther ends with the results that the generated signal amounts are made constant, and jitters of the wiring and receiver delay are suppressed.

4 Claims, 9 Drawing Sheets

U.S. PATENT DOCUMENTS

| | | | | | |
|---|---|---|---|---|---|
| 3,619,504 | A | * | 11/1971 | De Veer et al. | 375/257 |
| 3,764,941 | A | * | 10/1973 | Nick | 333/116 |
| 3,786,418 | A | * | 1/1974 | Nick | 375/257 |
| 5,329,263 | A | * | 7/1994 | Minami | 333/116 |
| 5,365,205 | A | * | 11/1994 | Wong | 333/109 |
| 5,376,904 | A | * | 12/1994 | Wong | 333/109 |
| 5,638,402 | A | | 6/1997 | Osaka et al. | |
| 6,111,476 | A | * | 8/2000 | Williamson | 333/109 |
| 6,414,891 | B2 | * | 7/2002 | Kuge et al. | 365/205 |
| 6,438,012 | B1 | | 8/2002 | Osaka et al. | |
| 6,496,889 | B1 | * | 12/2002 | Perino et al. | 710/110 |
| 6,625,682 | B1 | * | 9/2003 | Simon et al. | 710/305 |
| 6,654,270 | B2 | * | 11/2003 | Osaka et al. | 365/51 |
| 6,697,420 | B1 | * | 2/2004 | Simon et al. | 375/220 |
| 6,745,268 | B1 | * | 6/2004 | Greeff et al. | 710/100 |
| 6,882,239 | B2 | * | 4/2005 | Miller | 333/24 R |
| 7,075,795 | B2 | * | 7/2006 | Wu et al. | 361/785 |
| 7,088,198 | B2 | * | 8/2006 | Simon et al. | 333/24 R |
| 7,126,437 | B2 | * | 10/2006 | Simon et al. | 333/24 R |
| 2002/0018526 | A1 | | 2/2002 | Osaka et al. | |

FOREIGN PATENT DOCUMENTS

| | | | |
|---|---|---|---|
| JP | 2001-27918 | | 1/2001 |
| JP | 2001-27987 | | 1/2001 |
| JP | 2001027987 A | * | 1/2001 |
| JP | 2002-123345 | | 4/2002 |

OTHER PUBLICATIONS

Deutsch, Alina et al. "When are Transmission-Line Effects Important for On-Chip Interconnections?". IEEE Transactions on Microwave Theory and Techniques. vol. 45. No. 10. Oct. 1997. pp. 1836-1846.*

Salzman, David et al. "Capacitive Coupling Solves the Known Good Die Problem" by Salzman et al. IEEE. 1994. pp. 95-100.*

Knight, Jr., Thomas F. et al. "Manufacturability of Capacitively Coupled Multichip Modules". IEEE. 1994. pp. 605-608.*

Benham, J.R. et al. "An Alignment Insensitive Separable Electromagnetic Coupler for High Speed Digital Multidrop Bus Applications". IEEE MTT-S Digest. 2003. pp. 1163-1166.*

Salzman, David et al. "Application of Capacitive Coupling to Switch Fabrics". IEEE. 1994. pp. 195-199.*

* cited by examiner

FIG. 4
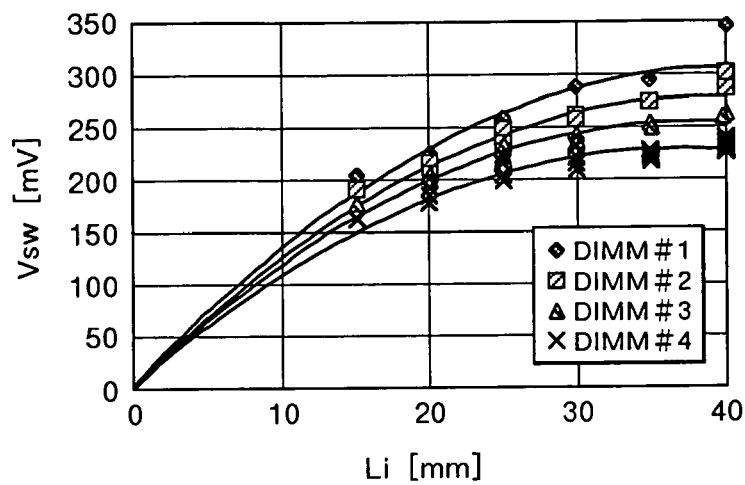
FIG. 5A  DRIVE PULSE
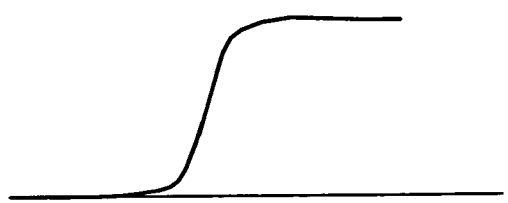
FIG. 5B  COUPLER SIGNAL
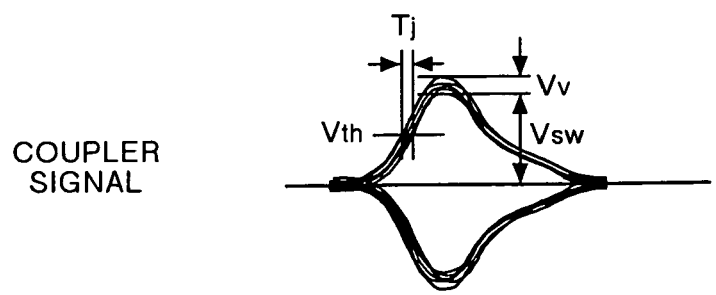

EQUAL-AMPLITUDE SIGNALING DIRECTIONAL COUPLING BUS

TECHNICAL FIELD

The present invention relates to a technique for signal transmission between devices such as a multiprocessor or a memory (for example, between digital circuits that are made up of MOS or between functional blocks thereof) in an information processor, and more particularly relates to a high-speed technique of bus transmission that conducts data transfer in which a plurality of devices are connected to the same transmission line.

BACKGROUND ART

In order to transfer data at a high speed in a state where a large number of nodes are connected to one another, a propagation delay time of wiring cannot be ignored. In particular, in a DDR-SDRAM (double data rate synchronous DRAM), an operating frequency of data is twice as large as that of an address, and the effect of noises reflected from a branched wiring on a bus wiring makes high speed difficult. Examples of methods for solving the above problem include "non-contact bus" in JP 07-141079A (U.S. Pat. No. 5,638,402), "directional coupling memory module" in JP 2001-027918A (U.S. Ser. No. 09/570,349), and "directional coupling bus system" in JP 2001-027987A (U.S. Ser. No. 09/569,876).

FIG. 2 shows the structure of the directional coupling bus disclosed in JP 07-141079A.

In the above method, data transfer between two nodes is conducted by using a backward crosstalk, that is, the transformation of from an NRZ signal to an RZ signal through a directional coupler. That is, this is a technique in which transfer between a bus master 10-1 and slaves 10-2 to 10-4 is performed by using two lines, that is, the backward crosstalk between a wiring 20 and wirings 20-1 to 20-4. This technique is suitable for transfer between a bus master 1 and the slaves 10-1 to 10-4, that is, suitable for data transfer between a memory and a memory controller. In this example, directional couplers that are connected to the bus are identical in the configuration with each other, and the coupling coefficients (KB) and the coupling lengths L1 to L4 of those directional couplers are also constant.

Subsequently, in a conventional example, "directional coupling bus system" of JP 2001-027918A, a main line 20 is folded back to provide the directional coupler with a multi-layer structure, thereby realizing a high density. Similarly, the coupling lengths of the directional couplers are constant in this example.

In the "directional coupling memory module" of JP 2001-027987A, a wiring (main line) from a memory controller is drawn in memory modules, and a directional coupler is structured within each of the memory modules. Similarly, in this example, the memory modules that are connected to the memory bus are identical in the configuration with each other, and the coupling coefficients (KB) and the coupling lengths of the directional couplers within the memory modules are also constant.

The above conventional examples have the feature that the lengths of the directional couplers are constant. The reasons are as below.

In general, when a rise time of a drive pulse is shorter than a propagation delay time of reciprocating of the directional coupler, the directional coupler generates an amount of backward crosstalk signal not depending on the coupling length. For that reason, a ratio of an input voltage to a backward crosstalk voltage gets constant not depending on the length. In FIG. 2, if attenuation when a drive waveform from an MC 1 propagates on the wiring 20 can be ignored, the production of the backward crosstalk signals by the wirings 20-1 to 20-4 becomes constant.

For that reason, in the conventional art, when it is assumed that the directional coupler lengths that generate the respective crosstalks are L1 to L4, L1=L2=L3 L4 is constant, and the wiring intervals of the directional couplers are also identical with each other in order to realize the same coupling coefficients of the directional couplers. The directional couplers that have the constant wiring intervals and lengths generate substantially the same signal amount with respect to any bus slaves.

As described above, in the conventional art using the directional couplers, the coupling lengths of the directional couplers within the bus to be used are constant, and an interval between two lines which determine the coupling coefficients (Kb) is also constant.

DISCLOSURE OF THE INVENTION

Even the above arts do not suffer from any problems in a practical use when the data transfer rate of the main line is a high-speed transfer rate of about several hundreds Mbps. This is because the directional couplers generate the sufficiently large signal generation with respect to the operating frequency.

However, the present inventors have advanced a research for further increasing the high speed of the bus performance when being applied to a memory system. The present inventors have studied a memory system of the XTL coupling system having an ultrahigh speed transfer rate in which the data transfer rate of the main line is about several Gbps or higher. As a result, the present inventors have found out novel problems related to an accent of a waveform of the RZ conversion signal which is attributable to the signal conversion of NRZ to RZ, a difference in the amplitude value of the RZ conversion signal between a master close side memory and a master far side memory, and an increase in the amount of jitters which is attributable to the high speed.

A method of determining the coupling length of the conventional directional coupler will be described below.

In FIG. 2, for example, a directional coupler that is made up of the main line 20 and the wiring 20-1 is considered. The wiring 20 is called "main coupling line", and the wiring 20-1 is called "sub coupling line". In the case where the drive pulse progresses on the main coupling line 20 from the left toward the right on the drawing, a backward crosstalk is generated on the left end (near end) of the sub coupling line 20-1. In the case of a stripe line that is structured such that the directional coupler is surrounded by a power plane, a forward crosstalk that is generated on the right end (far end) is small to the degree that can ignore the forward crosstalk. Even in the case of a micro strip line whose one side is structured by an air layer, the forward crosstalk is absorbed with a far end resistor.

When it is assumed that a rise time of the drive pulse is Tr, a propagation delay velocity of the sub coupling wire 20-1 is Vp, a propagation delay time is Td, and a wiring length is L, the directional coupler generates a signal of 2Td as the near end crosstalk signal under the condition of Expression (1), and a signal amplitude at this time is the maximum.

$$Tr \leq 2*Td \quad (1)$$

$$Td = L/Vp \quad (2)$$

For that reason, the coupling length of the directional coupler that generates the maximum backward crosstalk has a relationship shown in Expression (3), and the coupling length gets the shortest when equality is satisfied. When Expression (3) is satisfied with respect to the maximum rise time Tr when the drive pulse propagates in the main coupling line, the respective sub coupling lines 20-1 to 20-4 shown in FIG. 2 generate signals equal in quantity at their near ends.

$$L \geq \tfrac{1}{2} * Tr * Vp \qquad (3)$$

As described in the third problem with JP 2001-027918A, there is a phenomenon in which the high frequency components contained in the drive pulse gets large in the attenuation because of the skin effect and dielectric loss of the wiring, and therefore the rise time becomes longer with the directional coupler farther from the MC1. For that reason, the coupling length (L) is adjusted to Tr that becomes longer or the forward crosstalk is used in the conventional example.

In many instances, in order to manufacture the directional coupling with a high precision, a strip line structure that forms the inner layer of a multilayer substrate is used for the directional coupler, and the forward crosstalk cannot be used. For that reason, in FIG. 2, L1 to L4 are determined such that L4 satisfies Expression (3), and L1 to L3 are longer than a desired value.

In addition, it is proved that since a transmission signal becomes high in speed, a dull waveform occurs due to the directional coupler, and an intersymbol interference becomes larger. As one example, FIG. 3A shows a drive pulse and a crosstalk signal at the time of data transfer at 500 Mbps, and FIG. 3B shows a drive pulse and a crosstalk signal at the time of data transfer in the operation of 1 Gbps. In the case where the drive pulse is transmitted, a positive pulse and a negative pulse are generated at times corresponding to rise and fall. In the crosstalk waveform, both of the positive pulse and the negative pulse are shaped in a chopping wave, and the rise of the chopping wave is slower than the fall thereof.

As a result of observing the crosstalk signal waveform in more detail through an oscilloscope, it is found that a tail portion extends from the fall portion of the waveform. The portion is called "tail section". It is presumed that the tail section is caused by a dull waveform that occurs when each of the drive pulse and the crosstalk signal propagates in the directional coupler. This is because the high frequency component contained in the signal largely attenuates due to the skin effect and the dielectric loss of the wiring. For that reason, the attenuation becomes more remarkable as the distance is longer.

In FIG. 3A, since the tailsection of the positive pulse falls within a cycle (T) 2 ns, the tail section does not affect the negative pulse. However, as shown in FIG. 3B, when the cycle is 1 ns, the tail section of the positive pulse interferes with a subsequent negative pulse with respect to the directional couplers having the same wiring length. This is a phenomenon that is called "intersymbol interference" (ISI) because of the interference between two signals (symbols). For that reason, comparing a case having no data before one cycle of the negative pulse with another case having data, in the case having data, a signal is so generated as to be superimposed on previous data, the waveforms are misaligned. This misalignment causes jitters. This is because when the crosstalk waveform arrives at the respective bus slaves 10-1 to 10-4 in FIG. 2, a threshold voltage that is regulated by a receiver becomes faster or slower according to previous data.

The jitters obstruct the high-speed transfer. Also, in FIG. 2, the rise is dulled due to the skin effect as the drive pulse (NRZ signal) from the bus master 1 goes far away from the bus master 1. For that reason, the tail section becomes longer as the signal generated by the sub coupling lines 20-1 to 20-4 of the directional coupler is farther, and the crosstalk signal amount becomes smaller when the coupling length does not satisfy Expression (3).

For example, a signal that propagates to the bus slave 10-4 is smaller in the signal amount than a signal that propagates to the bus slave 10-1, and is duller in the waveform than the latter.

In addition, jitters occurring within the receiver become larger. This is because different waveforms are inputted to the receivers within the bus slaves 10-1 to 10-4. In general, in the case where the receiver has an insufficient gain, the receiver has differences in the sensitivity of noises and in a delay time at which the signal passes through the receiver due to the amplitude of the input signal. For that reason, because the receivers within the bus slaves 10-1 to 10-4 are different from one another in the input signal waveform, there are differences in the noise sensitivity and in the delay time. For that reason, when high-speed data is transferred, the differences in the noise sensitivity and delay time affect the operation of the receiver, which causes jitters.

An object of the present invention is to ensure a margin of a timing so as to surely conduct signal write and signal read even when the data transfer rate of the main line becomes ultrahigh speed. That is, the signal amount is kept constant, and jitters are reduced. As a result, there is provided a memory system that enables high-speed operation.

In the present invention, a first problem is that since the intersymbol interference become larger with higher speed, and a transition duration of the drive pulse is different according to the position of the directional coupler, the amount of jitters is also different according to the position of the directional coupler. For that reason, a first object of the present invention is to hold the timing margin of the entire system constant by making jitters occurring due to the directional coupler constant regardless of the position of the directional coupler.

In the data transfer between the bus master 1 and the bus slaves 10-1 to 10-4, an amplitude difference of the signal waveform which is caused by the arrangement is eliminated. As a result, the receiver jitters are largely suppressed, and the noise sensitivity is held constant, thereby making it possible to realize higher speed.

In the present invention, a second problem resides in that in the case where the coupling length of the directional coupler is insufficiently taken due to the structure of the system as in the memory module, or the bus slaves must be arranged at regular intervals, the directional couplers are so arranged as to make the coupling length of the directional coupler longest, and therefore the coupling lengths must also be held constant. For that reason, the signal amounts occurring between the slaves are different from each other, which causes jitters, as in the first problem. A second object of the present invention is to hold constant, a crosstalk signal amount that is generated in each of the bus slaves in a state where the bus slaves are arranged at regular intervals, and the bus slave intervals are not taken as in the memory modules.

In the present invention, the third problem resides in that since the tail section is contained in the generated waveform by the directional coupler, the tail section per se causes the jitters with higher speed. A third object of the present invention is to eliminate the tail section and hold the signal amplitude constant to reduce the jitters.

A means for solving the first problem is that the coupling length is changed according to the dulling of a signal that flows in the directional coupler to make the generated signal constant. The coupling length is decreased in the waveform that is smaller in the dulling, and the coupling length is increased in the waveform that is larger in the dulling.

A means for solving the second problem is the following. Even in the case where the coupling length of the directional coupler is not sufficiently taken due to the structure of the system, or the bus slaves must be arranged at regular intervals as in the memory module, in order to make constant the amount of the crosstalk signal that is generated in each of the bus slaves, the coupling coefficient of the directional coupler is adjusted. To achieve this structure, the wiring intervals of the directional couplers are made narrower as the directional couplers are farther away from the MC.

A means for solving the third problem is that a waveform that cancels the tail section is incorporated into the drive pulse. For example, in the case of a rise signal, a fall signal is superimposed on the rise signal shortly after the rise time so as to cancel the tail section. The fall signal is adjusted for each of the slaves according to the position of the directional coupler that is connected to the bus slave, the rise time, and the waveform of the tail section. The signal amplitude can be held constant with the elimination of the tail section, thereby making it possible to reduce the jitters.

BRIEF DESCRIPTION OF THE DRAWINGS

FIG. 4 is a graph showing a directional coupler length of a module and a signal amplitude that is generated by the directional coupler;

FIG. 5A includes diagrams showing the definition of waveforms(Drive Pulse) and FIG. 5B the definition of waveforms (Coupler Signal);

BEST MODE FOR CARRYING OUT THE INVENTION

Figure 1:
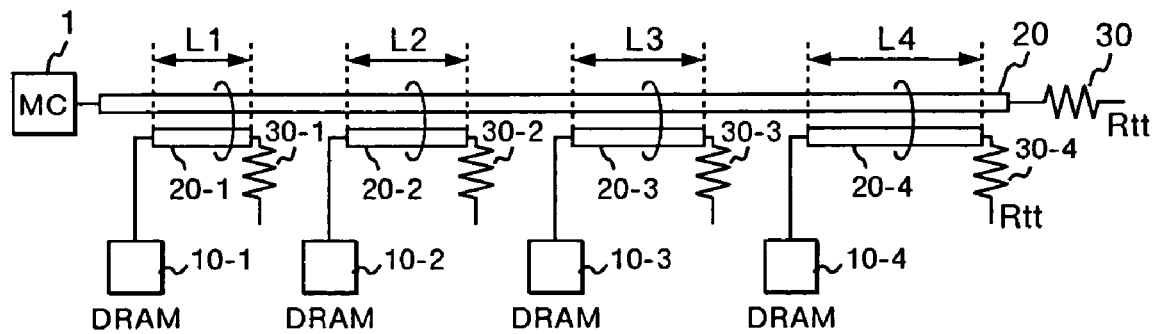
FIG. 1 is a diagram for explaining a first embodiment.
Figure 2:
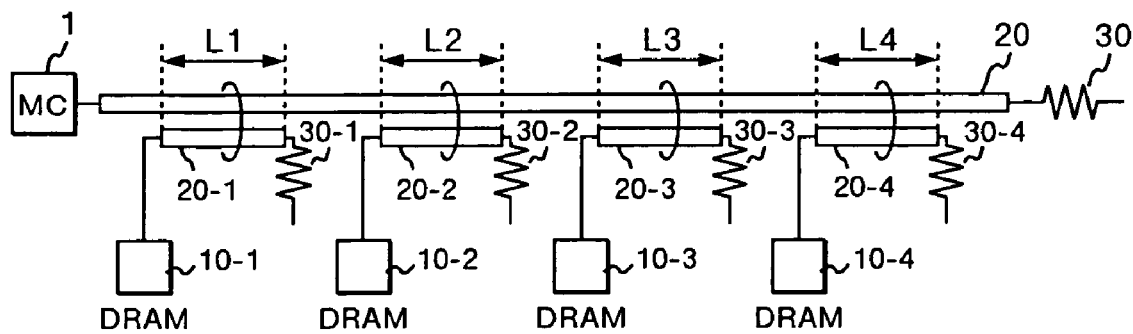
FIG. 2 is a diagram showing a conventional art.

A first embodiment will be described with reference to FIG. 1. This is an embodiment structuring a memory system.

Reference numeral 1 denotes an LSI chip having a memory controller control mechanism (hereinafter referred to as "MC": memory controller). References 10-1 to 10-4 denote memory chips (DRAM). In FIG. 1, four memories transfer data with respect to the MC 1. However, the object and the advantages are the same regardless of the number of memories.

Reference numeral 20 is a wiring (main line) which is drawn out of the MC 1, and has a far end which is matched and terminated with a termination resistor 30 (Rtt). The wirings 20-1 to 20-4 are arranged in parallel with the main line 20 at close positions, and constitute the directional couplers in association with the respective parts of the main line 20. Since the wirings 20-1 to 20-4 are other wirings that constitute the directional couplers, those wirings are called "sub coupling lines". The far ends of the sub coupling lines 20-1 to 20-4 when being viewed from the MC1 are matched and terminated, and the near ends thereof are wired to DRAMs 10-1 to 10-4, respectively. The terminating resistors 30, 30-1 to 30-4 are each connected to a terminating voltage (Vtt) with a lower impedance.

Herein, the coupling lengths of the directional couplers, that is, the parallel wiring lengths of the parts of the main line 20 and the sub couplers 20-1 to 20-4 are represented by L1 to L4, respectively.

FIG. 4 shows analysis results of the amplitudes of signals that are transmitted to the DRAMs 10-1 to 10-4 with the structure shown in FIG. 1, which is obtained through a circuit analysis simulation. In the conditions of analysis, the drive pulses is first outputted from the MC 1 and consist of random pulses of 32 patterns. As a result, the drive pulses include the effects of the intersymbol interference (ISI). The operating frequency is 1.3 Gbps. In FIG. 4, the axis of abscissa expresses the coupling lengths Li (herein, L1 to L4 are represented by Li) of the respective directional couplers, and the axis of ordinate expresses generated peak voltages Vsw.

The definitions of the waveforms are shown in FIG. 5. FIG. 5A shows a drive waveform, and FIG. 5B shows a crosstalk signal (coupler signal) waveform which is a waveform at a DRAM input section. In FIG. 5B, the signal amplitude at the DRAM input section is Vsw, the voltage variation at a peak section is Vv, a threshold potential is Vth, and jitters at Vth is Tj. The solid line in FIG. 4 indicates a generated signal peak voltage with respect the length Li at the DRAM 10-1, and the dotted line indicates a generated signal peak voltage with respect the length Li at the DRAM 10-4.

It is found from FIG. 4 that the signal amplitude at the position of the DRAM nearer to the MC1 is larger when the coupling length Li is the same. It is found that, for example, in order that the signal amplitude Vsw at the DRAM 10-1 generates 200 mV, L1=17 mm is acceptable, whereas in the DRAM 10-4, L4=25 mm is required.

For facilitation of design, in the case where the coupling length Li is set up with pitches of 5 mm, under the simulation, the following lengths can ensure 200 mV which is substantially equal in the signal amount with respect to the respective DRAMs 10-1 to 10-4 under the conditions of Expression (4).

L1=15 mm, L2=20 mm, L3=20 mm, L4=25 mm

In the conventional art, since all of the coupling lengths are set to 25 mm, the signal amplitude at the DRAM 10-1 is 260 mV, and the signal amplitude at the DRAM 10-4 is 200 mV which is different by 60 mV. For that reason, the delay times of the receivers within two DRAMs are different from each other, and a timing margin is reduced. In an example of design, since a delay difference of the receiver is about 110 ps with respect to an input amplitude voltage difference of 100 mV, 60 mV means the delay variation of 66 ps. Also, since the amount of jitters Tj of the directional coupler in this case is 137 ps, when the amount of jitters and the delay variation of the receiver are added up, the variation of 203 ps is obtained.

On the contrary, according to this embodiment, the random pulse is driven by 1.3 Gbps, all of voltages at the DRAMs 10-1 to 10-4 become substantially equal to each other, and the maximum of the amount of jitters at the directional couplers is 115 ps from the simulation result, which is smaller than that of the conventional art by 88 ps even taking the receiver variation into consideration. This corresponds to 10% of the operating cycle, and the timing margin can be ensured as much, or higher speed can be performed as much.

As described above, since the lengths of the directional couplers are adjusted according to the signal amount as indicated by Expression (4), a variation in the signal amount can be suppressed, and the jitters can also be suppressed. For that reason, a difference in the delay amount of the receivers within the respective DRAMs 10-1 to 10-4 can be minimized, and the timing margin of the bus can be increased. That is, it is found that this structure is effective for the high speed of the bus. In addition, since the respective intervals of the DRAMs 10-1 to 10-3 are not required to be adjusted to the longest directional coupler length of the DRAM 10-4, an interval between the DRAMs 10-1 and 10-2 and an interval between the DRAMs 10-2 and 10-3 can be narrowed. This enables the high density.

As a second embodiment, a description will be given of a structure in which the generated signal amount is held constant by changing the intervals between the wirings while holding the coupling lengths of the directional couplers constant with reference to FIGS. 6 and 7.

Figure 6:
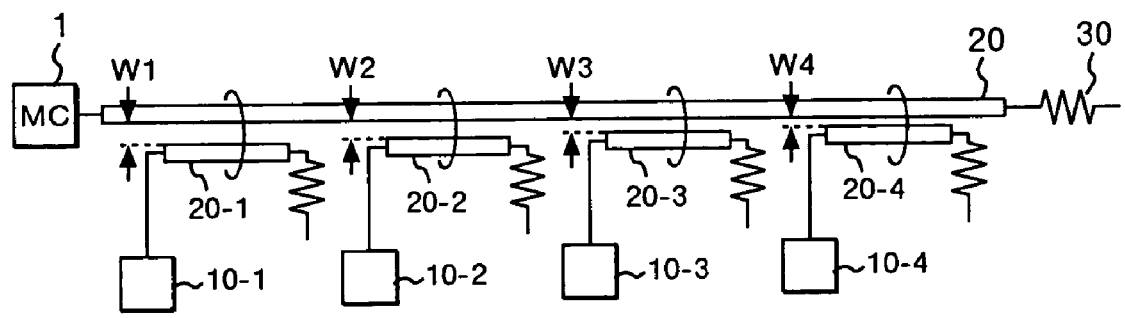
FIG. 6 is a diagram showing a directional coupler bus in which wiring intervals are adjusted according to a second embodiment.

Since the structural elements of FIG. 6 are identical with those of FIG. 1, only differences will be described. The sub coupling wirings 20-1 to 20-4 have the same length. However, intervals between the parts of the main line 20 and the parallel wirings of the sub couplers 20-1 to 20-4 which constitute the directional couplers are different from each other. It is assumed that the wiring interval between the sub coupling wire 20-1 and the main line 20 is w1, and similarly the wiring intervals between the sub coupling wirings 20-2 to 20-4 and the main line 20 are w2, w3 and w4, respectively. When the wiring-interval is indicated representatively, the wiring interval is represented by wi with the meaning of i-th.

Figure 7:
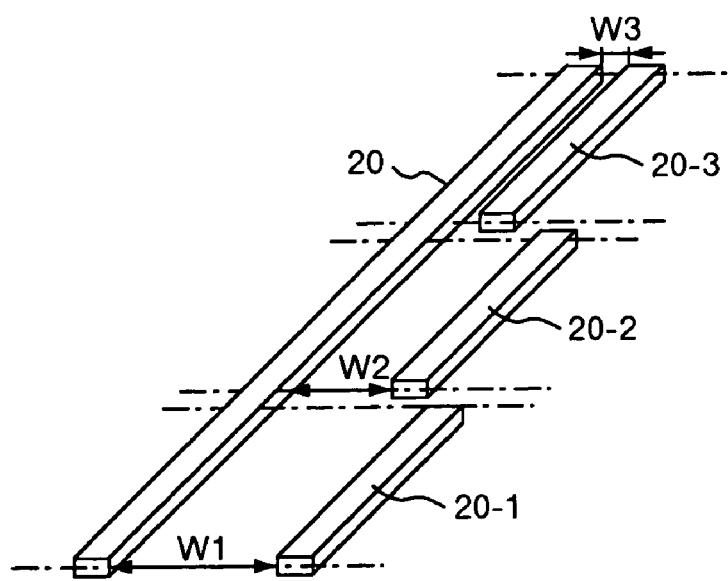
FIG. 7 is a diagram (bird's eye view) showing the directional coupler according to the second embodiment.

FIG. 7 is a bird's eye view showing the directional couplers disposed within a printed board 10. In the figure, cuboids are made of metal conductor. The main line 20 that constitutes the directional coupler and the sub coupling wiring 20-1 in front of the main line 20 are wired at an interval of w1, and the main line 20 and the sub coupling wiring 20-2 are wired at an interval of w2 that is narrower than w1. Since the wirings are surrounded by power layers at both of upper and lower portions, FIG. 7 is a diagram constituted by strip lines. The micro strip line having an air layer at one end and a power layer only at the other end establishes the following discussions.

The directional couplers different in the wiring interval w1 are different in the degree of coupling from each other. That is, the directional coupler wider in the interval wi is lower in the degree of coupling. This is because both of the capacitive coupling and the inductive coupling between two lines are reduced. In FIG. 7, the directional couplings are constituted in a horizontal direction, but may be constituted in a vertical direction.

The coupling coefficient Kb of the directional coupler is defined as represented by Expression (5).

Kb=(generated signal amount at a near end of the directional coupler)/(drive pulse voltage of the main coupling line)　　(5)

As described above, this is called "backward crosstalk coefficient", and takes a constant value when the rise time of the drive pulse is shorter than the propagation delay time of reciprocating of the directional couplers. In this case, when it is assumed that the capacitance matrix of two lines is [C], and the inductance matrix of two lines is [L] in the wiring structure of FIG. 7, the relationship of the following expressions are satisfied. In the expressions, the elements of the respective matrixes are represented by subscripts.

$$Zod=Sqrt[(L11+L12)/(C11+C12)] \quad (6)$$

$$Zev=Sqrt[(L11-L12)/(C11-C12)] \quad (7)$$

$$Kb=½\{(Zev-Zod)/(Zev+Zod)\} \quad (8)$$

Where Sqrt is a square root. The backward crosstalk coefficient Kb is represented by the elements of [C] and [L].

In FIG. 6, zones 1, 2, 3 and 4 are distinct in the order closer to the MC 1 in a zone where the main line 20 constitutes the directional couplers for convenience. The amount of attenuation of the drive pulse that progresses a section i is represented by $\alpha i$, and the degree of coupling of the directional coupler in the i-th zone is represented by Kbi. When it is assumed that the drive pulse that is inputted to the zone 1 of the main line 20 is V0, the signal amount Vi that is generated at the near end of the sub coupling line in the zone i is represented by numeral (9).

$$V1=Kb1*V0$$

$$V2=Kb2*V0*\alpha 1$$

$$V3=Kb3*V0*\alpha 1*\alpha 2$$

$$V4=Kb4*V0*\alpha 1*\alpha 2*\alpha 3$$

$$Vi=Kbi*V0*\Pi i\ (\alpha i) \quad (9)$$

Where $\Pi i\ (\alpha i)=\alpha 1*\alpha 2*\alpha 3\ldots *\alpha i$. The attenuation is different depending on the frequency component, and is larger with the higher frequency component due to the skin effect or the conductance loss. That is, a large amount of high frequency components exist in the transition section (rise section, fall section) of the NR signal that propagates on the main line 20. This regulates the peak value of a signal that is generated on the near end of the sub coupling line of the directional coupler. Therefore, it is natural that the amount of attenuation on the transition section is set to $\alpha$. However, a ratio of the signal Vi to Vi+1 which are induced by making the coupling coefficients Kb of the respective directional couplers identical with each other is substantially equal to $\alpha i$. As is understood from Expression (9), when Kbi is so adjusted to meet. "Kbi*$\Pi i$ ($\alpha i$)=constant", the generated signal amounts at the near ends of the sub coupling lines are substantially equal to each other. In this embodiment, the coupling lengths of the directional couplers are constant, Expression (10) may be satisfied with $\alpha i \approx \alpha$.

$$Kbi=1/(\alpha^{(i-1)}) \quad (10)$$

where symbol "x^i" expresses i power of x. In the data transfer of about 1 Gps, attenuation cannot be ignored. However, since the attenuation is not so large, Expression (10) can be modified into Expression (11) with $\alpha=(1-x)$ since $x<<1$.

$$Kbi = 1/((1-x)^{\wedge}(i-1)) \quad (11)$$

$$= Kb1 * (1 + (i-1) * x) \quad (i > 1)$$

As with FIG. 1, as a result of analyzing the circuit through simulation, in the case where Kb of the directional couplers is equal to each other, and the coupling length is 25 mm, the attenuation coefficient α is substantially 0.9, and x is 0.1.

Then, simulation is conducted in a system where the wiring interval wi is changed so that Kb2 is 1.1 times Kb1, Kb3 is 1.2 times Kb1, and Kb4 is 1.3 times Kb1. The value of wi in this case is represented by Expression (12).

$$w1=0.160 \text{ mm}, w2=0.135 \text{ mm}, w3= 0.15 \text{ mm}, w4=0.1 \text{ mm} \quad (12)$$

As a result of the simulation, it is found that the variation of Vsw between DIMM in this embodiment is 28 mV with respect to 61 mV, that is, about half of 61 mV when wi is constant. Jitters of the bus wiring are substantially the same, that is, 100 ps.

For that reason, although the effect of reducing the wiring jitters of the bus is little, since a variation in the input amplitude to the receiver between DIMM is low and a variation in the delay time of the receiver is low, this structure is effective for high speed.

Figure 8:
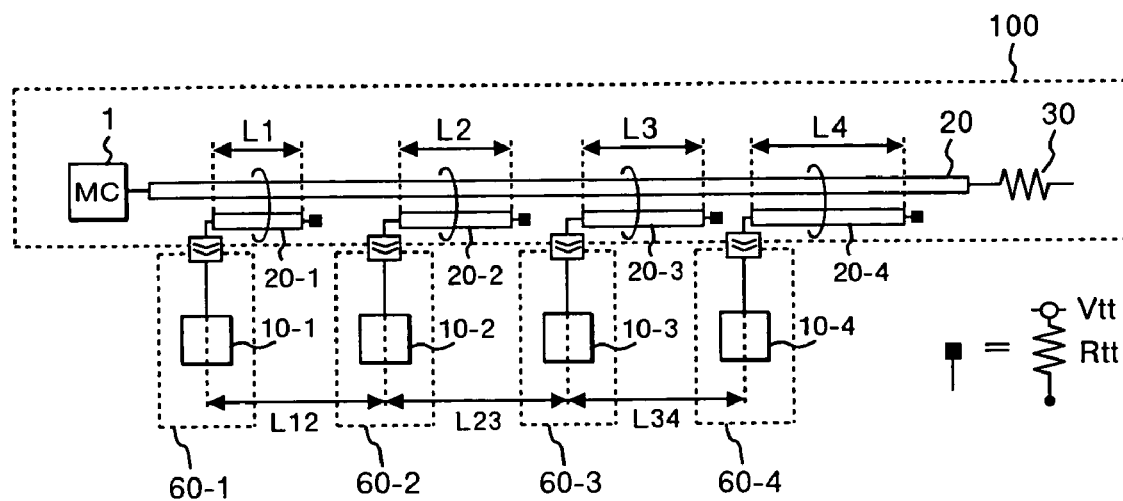
FIG. 8 is a diagram showing a directional coupler bus according to a third embodiment.

A third embodiment will be described with reference to FIG. 8. In this embodiment, even in the case of using the directional coupler having a coupling length different from that in the first embodiment, the module intervals are held constant.

The DRAMs 10-1 to 10-4 are mounted on daughter boards indicated by 60-1 to 60-4, respectively, and connected to a mother board 100 through connectors 50-1 to 50-4. An MC 1 is mounted on the motherboard 100, and the main line 20 and sub coupling lines 20-1 to 20-4 that constitute the directional couplers in association with parts of the main line 20 are formed on the motherboard 100. A large number of DRAMs are mounted on the daughter boards 60-1 to 60-4, but only one DRAM is shown in FIG. 8 for simplification.

A drive pulse from the MC 1 propagates on the main line 20 of the directional couplers, and signals that are generated by the directional couplers are transmitted to the DRAMs 10-1 to 10-4 through connectors 50-1 to 50-4, respectively. The same is applied to the reverse propagation of the data signal.

In this embodiment, the coupling lengths of the directional couplers are longer as the directional couplers are farther away from the MC 1 as in the first embodiment. However, the intervals of the modules 60-1 to 60-4 are constant in this embodiment. In the case where a power consumption of semiconductors such as the DRAMs 10-1 to 10-4 that are mounted on the modules 60-1 to 60-4 is large, intervals of some degree are required for heat radiation depending on the device. From the viewpoint of heat radiation, the structure in which the module intervals are constant has such an advantage that the installation structure is simplified even in the case where thermal diffusion is made by air since heat sources get uniform. For that reason, even in the case where the coupling lengths of the directional couplers are different from each other, the heat radiation property of the device is more excellent when the intervals of the modules are made constant. In this embodiment, the MC 1 and the DRAMs 10-1 to 10-4 which are connected through the bus can be made identical in the signal amplitude with each other, and the concentration of heat can be prevented with respect to the high power consumption DRAMs.

A fourth embodiment will be described with reference to FIG. 9.

In a semiconductor such as DRAM which transfers data, its bus frequently has a control signal and an address signal (C/A signal) in addition to a data signal. This embodiment is an example in which the directional couplers are constituted within a memory module in the case where the C/A signal is transferred by using the directional couplers.

It is difficult to adjust the intervals of the DRAMs because a large number of DRAM chips are mounted on a limited space in the DRAM memory module. For that reason, in the case where the C/A signal of the high-density DRAM module is transferred by the directional couplers, it is desirable to hold the generated signal amount constant by changing the coupling coefficients for each of the couplers as in the second embodiment.

Figure 9:
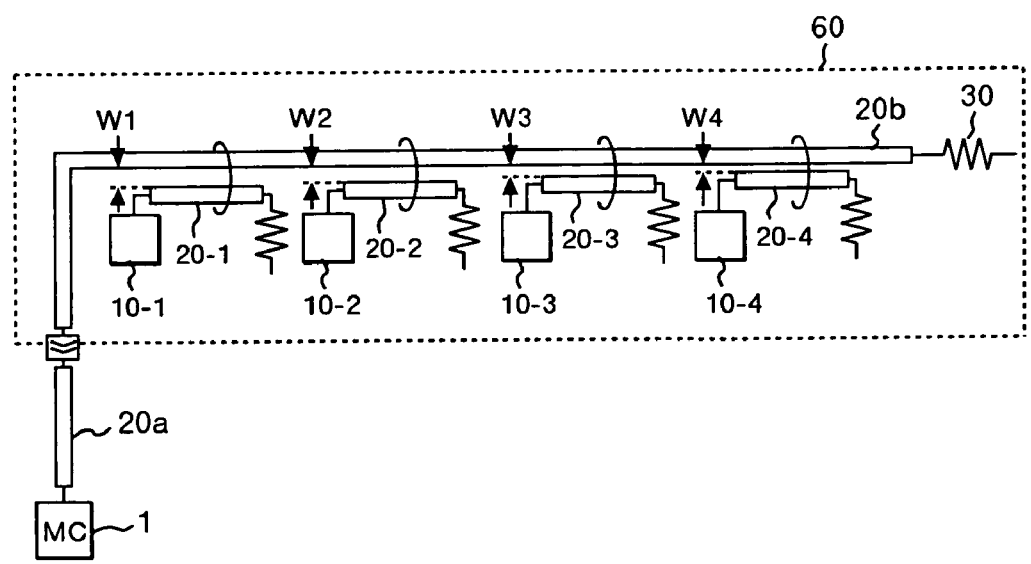
FIG. 9 is a diagram showing a directional coupler bus according to a fourth embodiment.

In FIG. 9, the DRAMs 10-1 to 10-4 are mounted in the memory module 60, and wirings of the DRAMs 10-1 to 10-4 and the MC 1 are shown. Reference 20a denotes a wiring that is used within the mother board 100 and extends from the MC1 to a connector 50. The wiring 20a is connected to a wiring 20b within the daughter board 60. The wiring 20b is matched and terminated, and parts of the wiring 20b and the sub coupling lines 21-1 to 21-4 constitute the directional couplers within the daughter board 60. The directional couplers that are connected to the DRAMs 10-1 to 10-4 have the coupling lengths as in the second embodiment, but the coupling coefficients Kb are changed with different wiring intervals, respectively. The Kb is determined at the same rate as that in the second embodiment. That is, the coupling coefficients (Kb) of the directional couplers that are positioned farther away from the MC 1 are made larger. For that reason, the amplitudes of the input signals that are generated by the directional couplers and propagated to the DRAMs 10-1 to 10-4 are substantially identical with each other. In addition, a variation in the signal amplitude and jitters can be minimized as compared with a case in which the wiring intervals wi are not changed. That is, it is found that the equal signals are generated. For that reason, there is an effect of reducing the jitters as in the above-mentioned embodiments. In this embodiment, the directional couplers are used for the C/A signal. The same effects can be obtained even if the directional couplers are used for data.

A fifth embodiment will be described with reference to FIG. 10. This embodiment is an example where, in a memory bus that transfers data by using the memory module 60 shown in the fourth embodiment, directional couplers for a C/A signal are incorporated into the module, and directional couplers for a data signal are incorporated into the motherboard 100.

The memory modules 60-1 to 60-4 have module substrates of the same structure on which a large number of DRAMs are mounted. The respective DRAMs are represented by numerals 10-1 to 10-4. The modules are roughly classified into pins and pads for the C/A signal and for the data signal, and those signals are connected to one another through connectors not shown.

The C/A signals are indicated by reference numeral 23 and wired to the respective modules 60-1 to 60-4 from the MC 1. The data signals are indicated by reference numeral 22 and wired to the respective modules 60-1 to 60-4 from the MC 1. The number of data signals is identical with the number of data signal pins of the modules, and the modules used in a PC/server have 32, 62 and 144 signal lines. The wiring structures for the data signal which include those plural wirings are substantially equal to each other.

Figure 10:
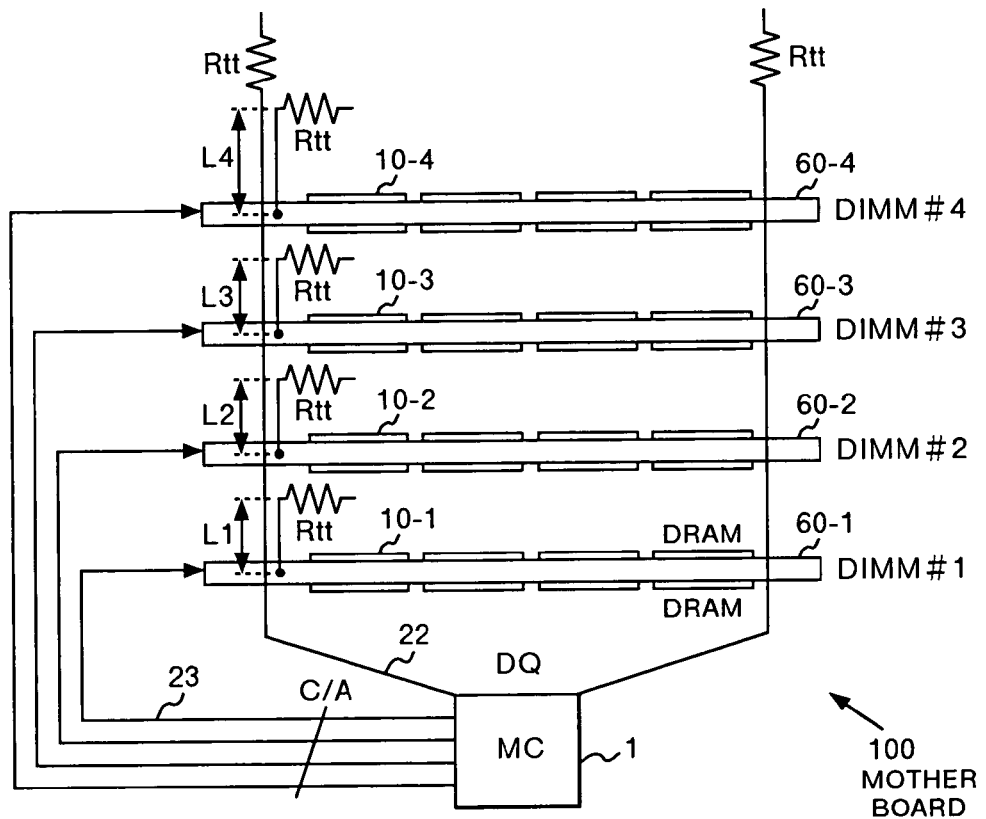
FIG. 10 is a diagram showing a directional coupler bus (memory system) according to a fifth embodiment.

FIG. 10 is a top view in the case where the memory modules 60-1 to 60-4 are vertically mounted on the motherboard 100, which is sketched for the purpose of clarifying the structure of wirings. The data signal wirings 22 from the MC 1 to the respective DRAMs 10-1 to 10-4 are transmitted and received through the directional couplers, and the directional couplers are constituted on the motherboard. The coupling lengths are indicated by L1, L2, L3 and L4 in the order closer to the MC 1. This structure is identical with that in the first embodiment. For that reason, the coupling lengths of the directional couplers which are farther away from the MC 1 are longer.

For that reason, the generated signal amount of the data signal is substantially identical with respect to each of the DRAMs, which has the effects of reducing the variation in the signal voltage and jitters and performing high speed.

Since the MC 1 and the modules 60-1 to 60-4 are connected to the C/A signals at 1:1, all of the DRAMs have substantially the same signal amount as in the fourth embodiment, which has the effects of reducing the variation in the signal voltage and jitters and performing high speed. That is, there is the effect of reducing jitters with respect to data as well as the C/A signal.

Figure 11:
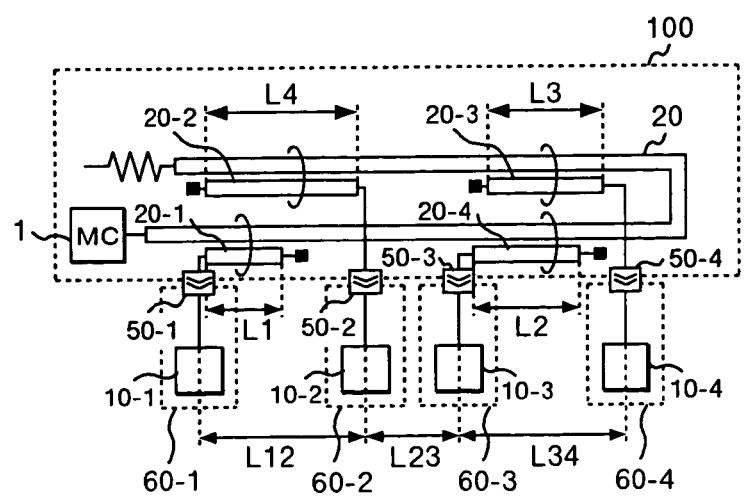
FIG. 11 is a diagram showing a sixth embodiment (a main line using a folded wiring)

A sixth embodiment will be described with reference to FIG. 11.

In this embodiment, the directional couplers that generate the equal signal amount are applied to wirings in which the main line is formed by a folded wiring so as to provide high density.

Reference numeral 20 denotes a folded wire drawn out of the MC 1. A large number of DRAMs are mounted on the memory modules 60-1 to 60-4, and are connected to the bus through the connectors 50-1 to 50-4, respectively. The sub coupling lines 20-1 to 20-4 are drawn from the modules 60-1 to 60-4 respectively that are arranged in the order closer from the MC 1. The sub coupling lines 20-1 to 20-4 are arranged in the stated order of the sub coupling lines 20-1, 20-4, 20-3 and 20-2 with the lengths of L1, L4, L2 and L3, respectively. The DRAM 10-1 is connected with the wiring 20-1 with the length L1, the DRAM 10-2 is connected with the wiring 20-2 with the length L4, the DRAM 10-3 is connected with the wiring 20-3 with the length L2, and the DRAM 10-4 is connected with the wiring 20-4 with the length L3. This example is characterized in that the directional couplers are arranged not at the distances from the MC 1 but at the distances from the main line 20.

As described above, since the main line 20 is folded, and the sub coupling lines are constituted with respect to the main line 20, the high density of the module can be performed, and the signal amplitudes that are generated from the directional couplers can be made constant. Also, when the sub coupling lines 20-2 and 20-3 are so arranged as not to overlap with each other, an interval L23 between the modules 60-2 and 60-3 can be reduced. This is because there is no directional coupler in that zone.

As a result, the directional couplers that have the memory modules of the same number with high density and generate the equal signal amount can be constituted.

Figure 12:
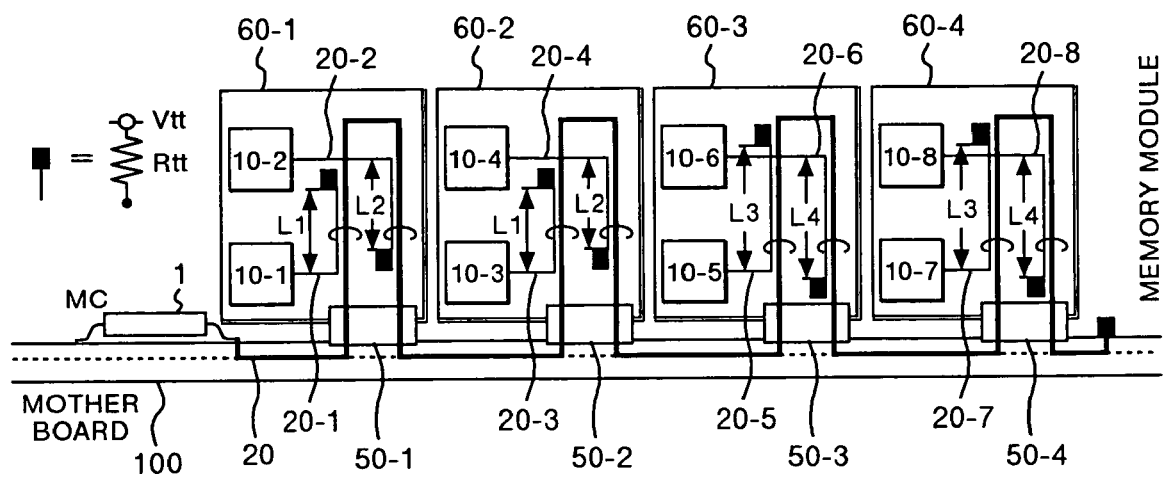
FIG. 12 is a diagram showing a memory bus in which a main line is folded within a module according to a seventh embodiment.

A seventh embodiment will be described with reference to FIG. 12.

This embodiment is an example in which the directional couplers are so constituted as to generate the equal signal amount in a bus system where the main line is folded within the module.

The main line 20 from the MC 1 is connected and wired to the interior of the module 60-1 through a signal layer disposed within the motherboard 100 and a connector 50-1. The wiring 20 within the module 60-1 and the sub coupling lines 20-1 and 20-2 constitute the directional couplers which are connected to the DRAMs 10-1 and 10-2. The main line 20 is folded within the module 60-1, and is again wired to a connector 50-2 in the signal layer within the motherboard 100 through the connector 50-1. In the same manner, the main line 20 within the modules 60-2, 60-3 and 60-4 is terminated by terminating resistors on the motherboard. In this example, the modules 60-1 and 60-2 are identical in the structure with each other, and when it is assumed that the coupling lengths of those two directional couplers are L1 and L2, respectively, a relationship of $L1 \leq L2$ is satisfied. In addition, the modules 60-3 and 60-4 are identical in the structure with each other, and when it is assumed that the coupling lengths of those two directional couplers are L3 and L4, respectively, a relationship of $L3 \leq L4$ is satisfied. A relationship between those two kinds of modules is represented by Expression (13).

$$(L1 \leq L2) \leq (L3 \leq L4) \tag{13}$$

With the above structure, the wiring lengths of the directional couplers have the same effects as those in the first embodiment, and the generated crosstalk signal amounts are made identical with each other, thereby making it possible to suppress jitters. For that reason, differences in the delay amount of the receivers within the respective DRAMs 10-1 to 10-8 can be supported, and the timing margin of the bus can be increased. That is, this shows that this structure is effective for high speed of the bus.

In the directional coupling memory system that conducts a bus connection by inserting the module into the connector, even in the case where the lengths of the directional couplers become longer as the directional couplers are positioned farther away from the MC 1, the kind of modules is limited to two kinds, thereby forming both of a reduction in the costs and an improvement in the performance.

Figure 13:
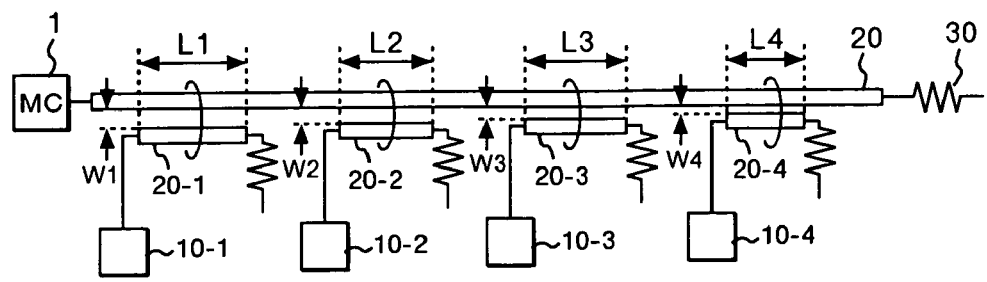
FIG. 13 is a diagram showing a directional coupler bus in which the coupling length and the coupling length of a directional coupler are adjusted.

An eighth embodiment will be described with reference to FIG. 13.

This embodiment is to aim for higher speed than that in the above embodiments.

The structure is substantially identical with that in the first embodiment, but different in the structure of the directional couplers therefrom.

In this embodiment, the wiring intervals wi between two lines (the main line and each of the sub coupling lines 20-1 to 20-4) which constitute the directional couplers are different from one another, and the coupling lengths Li therebetween are different from one another.

$$w1 \geq w2 \geq w3 \geq w4 \tag{14}$$

$$L1 \geq L2 \geq L3 \geq L4 \tag{15}$$

In Expression (14), the wiring intervals wi of the directional couplers of the nearer end when being viewed from the MC 1 are longer, and for that reason, the backward crosstalk coefficients Kb of the directional couplers of the farther end are higher. However, the differences of Kb cancel the dull effect as the drive pulse signal propagates on the main line 20. Also, the coupling lengths Li are shorter with the farther ends in this embodiment although the coupling lengths Li are longer with the farther ends in the first embodiment. This means that since the drive pulses are dulled more with the farther ends, the tail sections generated become longer with the farther ends. For that reason, in order to suppress an increase in the tail sections and an increase in jitters which are attributable to the dull waveform of the drive pulse, the coupling lengths Li are shortened. Since the structure completely opposite from that in the first embodiment is made, the signal amount is reduced with the decrease in the coupling lengths Li, but this is compensated by increasing the coupling coefficient Kb. That is, since the coupling lengths Li and the wiring intervals wi are constituted as expressed in Expressions (14) and (15), the generated crosstalk signals have the comparable signal amplitude and the comparable signal time width. For that reason, it is possible to suppress an increase in jitters and the delay time jitters of the receivers, which are attributable to the wiring. For that reason, this structure is suitable for data propagation of further ultrahigh speed as compared with that in the first embodiment.

The eighth embodiment will be described with reference to FIG. 14.

Figure 14:
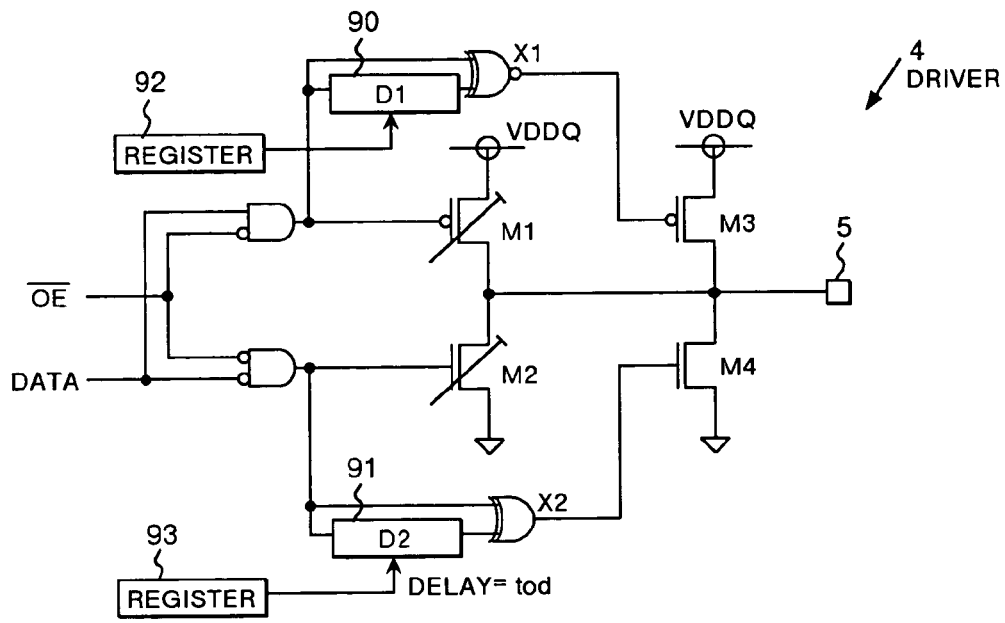
FIG. 14 is a diagram showing a driver circuit 4 for canceling the tail section.

FIG. 14 shows a drive 4 of a semiconductor device which is mounted on the MC 1 or the DRAMs 10-1 to 10-4 in the above embodiments, and this embodiment aims at the suppression of jitters by eliminating the tail section.

Before the structure of this embodiment will be described, the principle of a reduction in jitters will be described using waveforms with reference to FIG. 15.

Figure 3A:
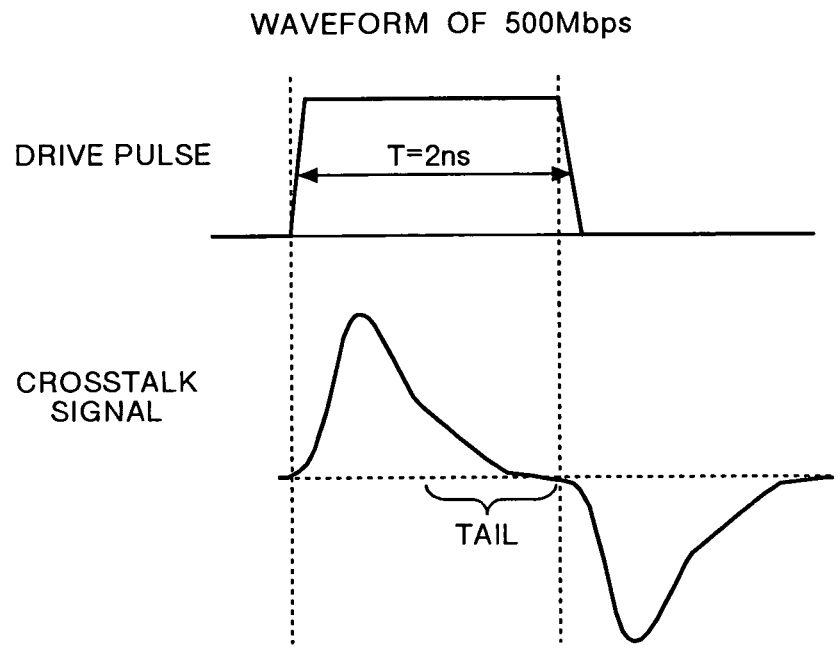
FIG. 3A is graphs showing a conventional waveform (500 Mbps) and FIG. 3B a conventional waveform (1 Gbps)
Figure 3B:
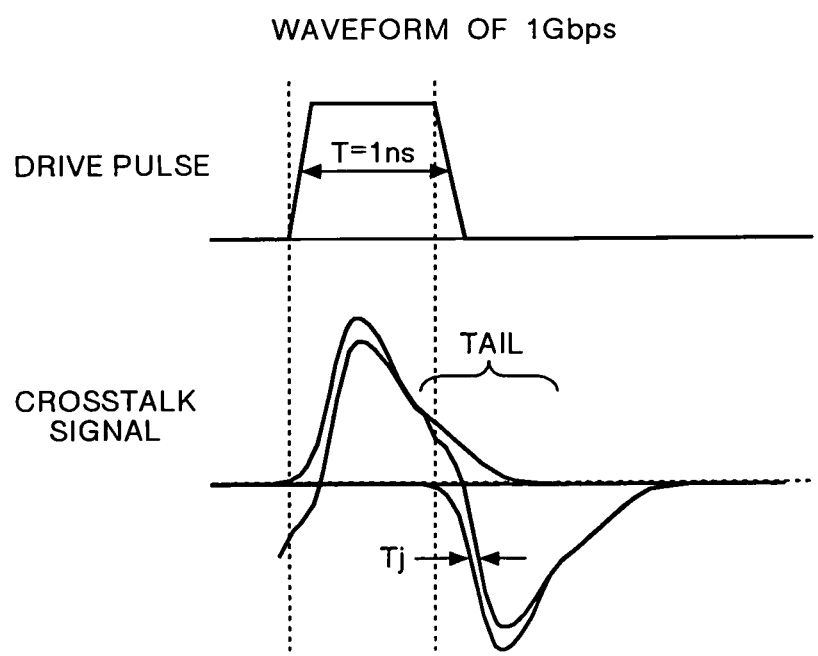

As shown in FIG. 3, in the case of conducting the high speed data transfer, the intersymbol interference on the bus wiring occurs mainly because the tail section of the crosstalk signal is superimposed on data subsequent to that crosstalk signal. For that reason, when the tail section of the crosstalk signal is reduced, the mount of jitters which is the intersymbol interference of the bus can be reduced.

Figure 15A:
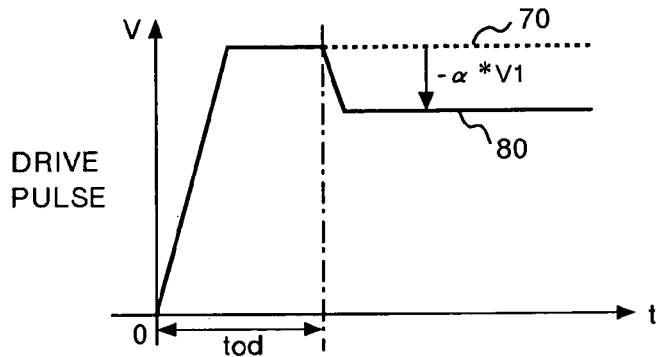
FIG. 15A are graphs showing a drive waveform for canceling the tail section and FIG. 15B a crosstalk waveform in which an intersymbol interference is reduced.
Figure 15B:
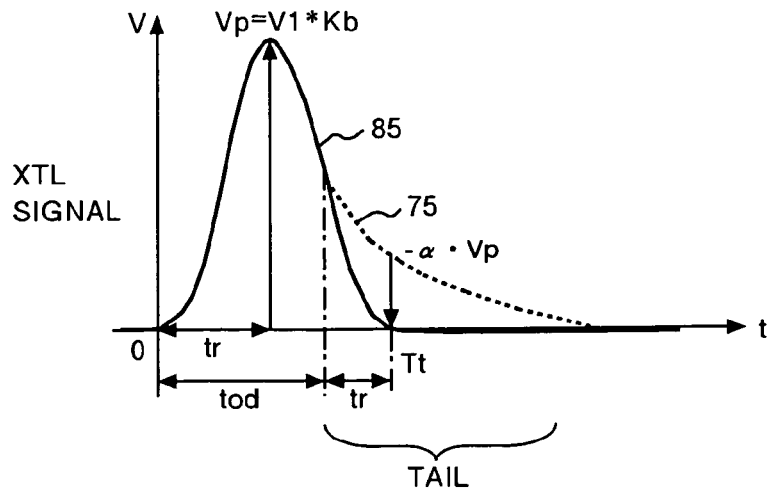

FIG. 15A shows a drive pulse for reducing the tail section, and FIG. 15B shows a crosstalk signal waveform therefore. A dotted line 70 is a conventional waveform which is identical with the drive pulse of FIG. 3B, and is superimposed on a solid line till a time tod. A solid line 80 represents the drive pulse in this embodiment.

A pulse is driven with an amplitude V1 at a time "0", and after a time tod, a pulse having a reverse polarity to data is driven with $(-\alpha*V1)$. In this example, $\alpha$ is a coefficient which is about 10 to 20%. FIG. 15 is an explanatory diagram of the waveform which is driven from L to H, and similarly in the case of the waveform driven from H to L, $(+\alpha*V1)$ having a reverse polarity to data is driven after Tod.

A crosstalk waveform to the drive pulse 70 indicated by the dotted line is represented by a waveform 75 indicated by the dotted line in FIG. 15B whereas a crosstalk waveform to the drive pulse 80 indicated by the solid line in FIG. 15A is represented by a waveform 85 indicated by the solid line in FIG. 15B. The waveforms 75 and 85 are superimposed on each other till the time tod. This is because the drive pulses 70 and 80 that propagate the directional couplers are identical with each other till the time tod. However, after the time tod, since the drive pulse indicated by the solid line is driven with the reverse polarity and also with the amplitude $(-\alpha*V1)$, a signal of the reverse polarity is generated by the directional coupler in response to the above drive pulse, and superimposed on the waveform 75 indicated by the dotted line. For that reason, the superimposed waveform becomes the maximum $(-\alpha*V1)$ after a time (tod+tr), and is superimposed on the waveform 75 indicated by the dotted line whereby the tail section is reduced in size as represented by the waveform 85 of the solid line. In this example, Vp has a relationship of Vp=Kb*V1 as with Expression (9) when it is the maximum of the crosstalk generated by the directional coupler and satisfies Expression (1). Reference tr is a rise time of the drive pulse, and at that time, the crosstalk waveform becomes the maximum.

As described above, since the drive waveform is generated as with the waveform 80 indicated by the solid line in FIG. 15, the tail section of the crosstalk can be minimized with the result that the intersymbol interference of the bus is reduced, which contributes to a reduction in jitters and high speed.

A driver that realizes the waveform is shown in FIG. 14. FIG. 14 mainly shows the circuit structure at a final stage of the driver 4. In this embodiment, the driver is made up of a push-pull driver of C-MOS. However, it is needless to say that the waveform shown in FIG. 15 can be gotten even when an open-drain type interface is used.

In FIG. 14, the driver of the final stage is made up of transistors M1 to M4, and its data output to an output pad 5 is controlled according to a data signal (DATA) and an output enable (OE) signal. OE is negated, and the transistors M1 to M4 generate outputs according to DATA. M3 and M4 of those transistors are driven for only a given period of time. Those transistors M3 and M4 are controlled by delay circuits 90, 91 and exclusive ORs X1, X2. In other words, the transistors M2 and M4, or M1 and M3 are driven at the same time according to the DATA signal. Since the inputs of X1 and X2 becomes equal to each other by means of the delay circuits 90 and 91, the transistors M3 and M4 are negated. In this example, since the drain-to-source impedances of the transistors M3 and M4 correspond to $\alpha$ in FIG. 15B, the gate widths of the transistors can be so adjusted as to control $\alpha$.

The delay circuits 90 and 91 have delay times adjusted by delay holding circuits (registers) 92 and 93, respectively. The delay circuits 90 and 91 are constituted in such a manner that a plurality of minute delay elements are connected in series, and those outputs change over by means of a switch, thereby making it possible to delay the signals. Since the delay circuits 90 and 91 can select the number of minute delay elements to be connected according to the values of the registers 92 and 93, respectively, by means of the switch, the delay amount can be discretely and continuously adjusted. The registers 92 and 93 hold values that allow the delay times that are substantially equal to tod of FIG. 15 to occur.

Since M1 and M3, or M2 and M4 are driven for period of times corresponding to the delay circuits 90 or 91, respectively, the drive impedances are decreased for that period of time, and it is understood that the waveform 80 in FIG. 15A is obtained.

The driver 4 is used for a signal output circuit of the MC 1 in FIG. 1, and the MC 1 is driven as indicated by the waveform 80 in FIG. 15B with respect to each of the DRAMs 10-1 to 10-4 at the time of write. As a result, in each of the directional couplers 20-1 to 20-4, since the tail section is reduced, the intersymbol interference is reduced, and the timing margin is increased. That is, the high speed operation can be performed.

Likewise, the driver 4 is used with respect to the DRAMs 10-1 to 10-4, and the waveform 80 in FIG. 15A is outputted at the time of read. As a result, in each of the directional couplers 20-1 to 20-4, since the tail section is reduced, the intersymbol interference is reduced, and the timing margin is increased. That is, the high-speed operation can be performed.

Figure 16:
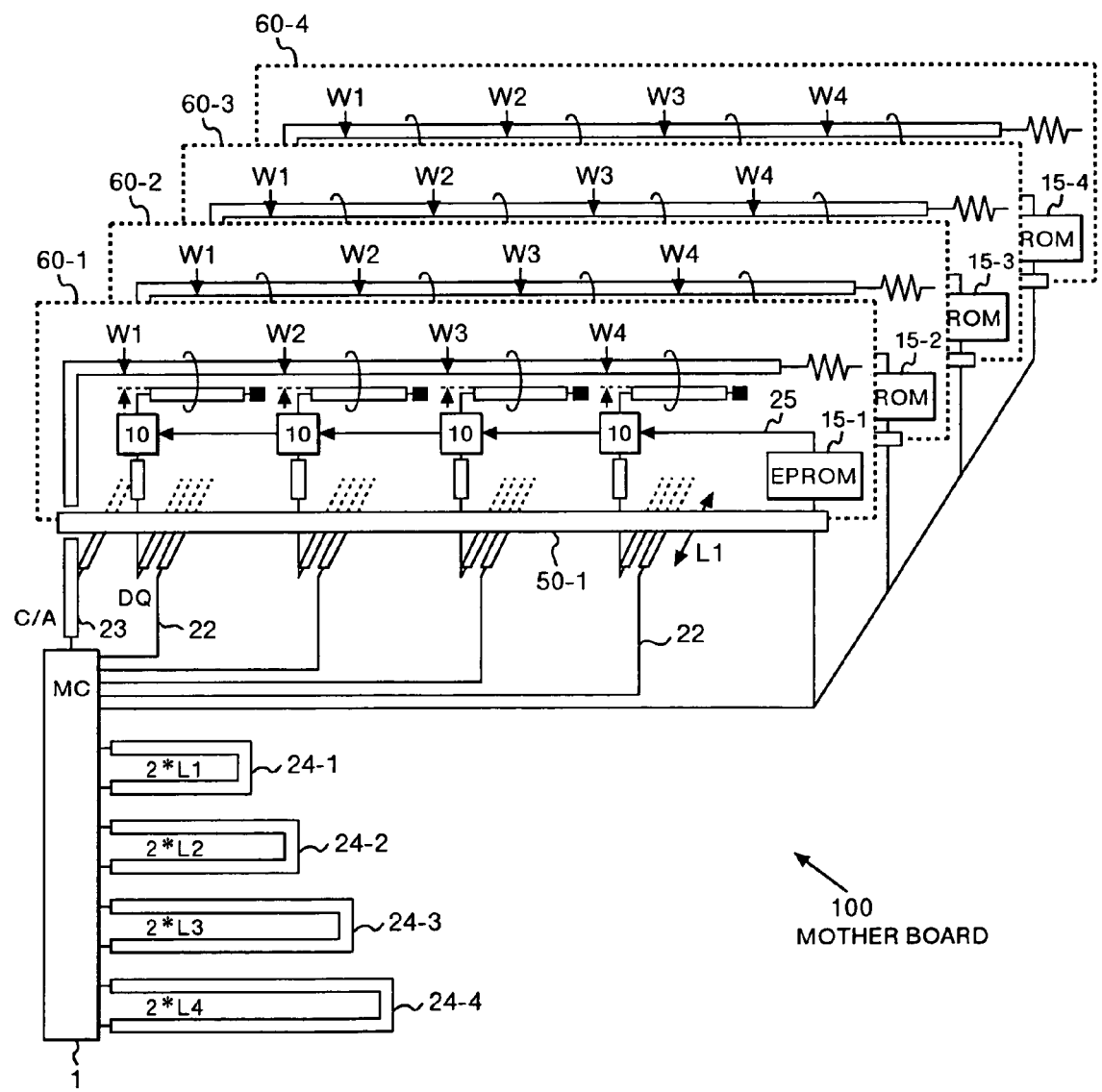
FIG. 16 is a diagram (bird's eye view) showing a directional coupler bus.

Now, setting of tod will be described with reference to FIG. 16.

As in FIG. 10, data is transferred between the MC 1 that is mounted on the motherboard 100 and the memories 10 that are mounted on the memory modules 60-1 to 60-4. The C/A signal is transferred through the wirings 23, and the data signal is transferred through the wirings 22. In this example, the data is transmitted and received by the directional couplers disposed in the motherboard 100, and the C/A signal is transmitted by the directional couplers disposed in the memory modules 60-1 to 60-4. In the data signal, the directional couplers have the coupling lengths L1, L2, L3 and L4 disposed within the motherboard 100 with respect to the modules 60-1 to 60-4. The coupling lengths L1 to L4 are determined as represented by Expression (4) as in the first embodiment. For that reason, there is no difference in the generated signal amount due to distances from the MC 1. The drivers shown in FIG. 14 are incorporated into the MC 1 and the memories 10, and can drive the waveform indicated by the solid line 80 in FIG. 15 at the time of drive. The setting of tod will be described in the MC 1 and the memories 10, separately.

In the case of the MC 1, the MC 1 is connected with wirings 24-1 to 24-4, and those wirings 24-1 to 24-4 have wiring lengths having the same propagation delay times as the reciprocating times of the directional couplers L1 to L4. For that reason, the MC 1 can recognize the reciprocating delay time of the coupling length L1 of the directional coupler with respect to the module 60-1 by measuring the delay time of the wiring 24-1. Similarly, the coupling lengths L2 to L4 of the directional couplers can be recognized by measuring the propagation delay times of the wirings 24-2 to 24-4. On the basis of that information, values of the registers 93 and 94 within the driver 4 in FIG. 14 which are mounted in the MC 1 can be set. In the case where the MC 1 transmits write data using the above information, a pulse having a reverse polarity to data can be driven for the time tod corresponding to the reciprocating delay times of the coupling lengths L1 to L4 of the directional couplers that are connected to the modules 60-1 to 60-4; therefore, the intersymbol interference is reduced, and high speed can be performed.

In the case of the memory 10, delay time information that is stored in rewritable ROMs (EPROMs) 15-1 to 15-4 that are mounted in the memory modules 60-1 to 60-4, respectively, is transferred to the registers 93 and 94 within the driver 4 of the memory 10 prior to data transmission. More specifically, the MC 1 writes the reciprocating propagation time information on the coupling lengths L1 to L4 of the directional couplers corresponding to the respective modules 60-1 to 60-4 into EPROMs 15-1 to 15-4 respectively in advance. The write timing may be set immediately after the power is turned on or every given time. The EPROMs 15-1 to 15-4 hold the written information, and the values are transmitted to the memories 10 through wirings 25. The delay time information may be transmitted to the memories 10 by writing the information into the respective memories using boundary scan information by the MC 1, or by giving the information to the respective memories 10 according to a request of the memories 10 by the EPROMs 15-1 to 15-4.

The MC 1 writes the reciprocating propagation delay time information of the directional couplers into the EPROMs 15-1 to 15-4, and stores that information in the registers 93 and 94 within the memories 10. With this structure, the memories 10 can each send tail section reduction drive pulses corresponding to the coupling lengths of the directional couplers with respect to read data of memory access. As a result, the intersymbol interference is reduced, and jitters are also reduced.

In the above example, the DRAMs are controlled through the boundary scan circuit. However, the boundary scan circuit may be changed over by a metal mask during manufacture of the DRAMs.

In addition, the MC 1 may use respective different values α for the DRAMs 10-1 to 10-4. For example, α=10% may be used for the DRAMs 10-1 and 10-2, and α=20% may be used for the DRAMs 10-3 and 10-4. The different values a can be achieved by adjusting the output impedances of the driver 4, and can be realized by connecting it to the transistors M3 and M4 in FIG. 14 in parallel and switching over those transistors. Since tod and α are constituted for each of the DRAMs in this manner, the tail section can be reduced while the signal amplitude is held constant in any DRAM, thereby making it possible to suppress the intersymbol interference. The same effects are obtained in FIG. 6 as well as FIGS. 8 to 13.

In this embodiment, the waveform 80 in FIG. 15A is generated by the driver. However, the same effects can be obtained if the same waveform can be generated even by other methods. For example, the waveform having tod and a as shown in FIG. 15 can be generated by a wiring having an impedance that is different form the characteristic impedance of the main line 20.

In the first advantages of the present invention, the wiring lengths of the directional couplers that are formed of two wirings on the printed board is made longer as the directional couplers are located farther away from the MC, thereby making the crosstalk signals that are generated by the directional couplers identical in any directional couplers. This makes it possible to compensate for the drive pulse being more dulled due to the skin effect and dielectric loss as the drive pulse propagates to the farther end.

Jitters generated by the directional couplers are made constant regardless of the position of the directional couplers, thereby making the timing margin of the entire system constant.

In the data transfer between the bus master 1 and the bus slaves 10-1 to 10-4, a difference in the amplitude of the signal waveforms, which is generated according to the arrangement, can be eliminated. As a result, a variation in the delay of the receivers is greatly suppressed, thereby being capable of making the noise sensitivities of the receivers constant. Consequently, higher speed operation can be performed. That is, the present invention is effective for the high speed of the bus.

In the second advantages of the present invention, even in the case where the coupling lengths of the directional couplers are insufficiently obtained, or the bus slaves must be arranged at regular intervals due to the structure of the system as with the memory module, the bus slaves are arranged at regular intervals so that the coupling lengths of the directional couplers become the longest, and the intervals of the wirings is more narrowed as the wirings are farther, thereby being capable of making the crosstalk signal amount generated in each of the bus slaves constant. With this structure, both of the equal interval arrangement and the equal signal generation can be performed.

In the third advantages of the present invention, since waveforms generated by the directional couplers include the tail sections, the intersymbol interference due to the tail sections causes jitters. However, since a pulse having a reverse polarity to data is driven by the driver α times the drive pulse amplitude (about 10 to 20%) for the reciprocating delay time of the directional couplers, the tail section can be eliminated. For that reason, it is possible to make the signal amplitude constant and to eliminate the intersymbol interference caused by the tail section. Hence, higher-speed operation can be performed.

INDUSTRIAL APLICABILITY

According to the present invention, in the memory system to which a plurality of DRAM memory modules are connected, since data can be transferred between the memory controller and the respective modules at high-speed by suppressing jitters, the present invention is applicable to a memory system that can perform data transfer at high speed as the entire system.

The invention claimed is:

1. A bus system adapted to transfer data between a plurality of semiconductor devices, comprising:
   a first wiring extending in a first direction from a first semiconductor device;
   n-coupling wirings forming directional couplers extending in sequence away from said first semiconductor device in said first direction, each of said directional couplers being parallel to said first wiring; and
   n semiconductor devices, different from the first semiconductor device, each respectively connected to a corresponding one of said directional couplers,
   wherein each of the directional couplers has a predetermined coupling length and a predetermined wiring interval of spacing from the first wiring,
   wherein the coupling lengths of the directional couplers decrease as the respective distance of the directional couplers from the first semiconductor device increases, and
   wherein the wiring intervals of spacing of the directional couplers from the first wiring decrease as the respective distances of the directional couplers from the first semiconductor device increase.

2. A bus system according to claim 1, wherein the first semiconductor device is a memory controller.

3. A bus system according to claim 1, wherein the n semiconductor devices are DRAMS.

4. A bus system according to claim 2, wherein the n semiconductor devices are DRAMS.

* * * * *

UNITED STATES PATENT AND TRADEMARK OFFICE
CERTIFICATE OF CORRECTION

PATENT NO. : 7,475,179 B2
APPLICATION NO. : 10/517591
DATED : January 6, 2009
INVENTOR(S) : Hideaki Osaka It is certified that error appears in the above-identified patent and that said Letters Patent is hereby corrected as shown below:

Title page please insert Item: -- (30) Foreign Priority Application Data: JP 2002-191583, filed July 1, 2002 --

Signed and Sealed this

Eighth Day of September, 2009

David J. Kappos
*Director of the United States Patent and Trademark Office*